United States Patent [19]

Lastinger

[11] Patent Number: 5,602,978
[45] Date of Patent: Feb. 11, 1997

[54] METHOD AND APPARATUS FOR A DEPTH SEAMED THREE-DIMENSIONAL VISUAL ENVIRONMENT

[76] Inventor: Carroll H. Lastinger, 21634 Westcliffe Falls Dr., Katy, Tex. 77450

[21] Appl. No.: 115,893

[22] Filed: Sep. 1, 1993

[51] Int. Cl.$^6$ .................................................. G06T 15/00
[52] U.S. Cl. ............................... 395/119; 353/7; 348/52; 348/744
[58] Field of Search ...................... 395/119, 120, 395/125, 127, 133, 135, 138, 139, 152–154, 155, 161, 162; 358/230, 231; 354/112, 113, 293, 294

[56] References Cited

U.S. PATENT DOCUMENTS

| | | |
|---|---|---|
| 1,136,236 | 10/1913 | Killman . |
| 4,123,152 | 10/1978 | Farnum ................................. 352/69 |
| 5,023,725 | 6/1991 | McCutchen ........................... 358/231 |
| 5,125,733 | 6/1992 | Lee ......................................... 353/7 |

*Primary Examiner*—Almis R. Jankus
*Attorney, Agent, or Firm*—Bush, Riddle & Jackson

[57] ABSTRACT

A method and apparatus described as a visual transporter device is provided comprising a plurality of screens arranged to establish a substantially encompassing visual environment having the capability of visually transporting an entire person or persons out of a room by visually removing the screens and visually locating the viewer within a dimensional visual representation of a "created" environment generated by computer, a dimensional visual representation of a "real" environment generated by video-format imaging and photographic processes, and a combination of a "created" computer generated visual environment coalesced with a "real" visual environment generated by video and photography. This visual transporter device visually removes the physical room and replaces it with a created and/or real visually dimensional environment having the ability to utilize a three-dimensional image-alignment algorithm to produce depth perceptible multi-dimensional imagery having no depth scope limitations (in other words an infinite horizon capability) and dimensional imagery intrusion into the enclosure viewing space occupied by the viewer, thereby producing intrusive and extrusive multi-dimensional, multi-planar visual imagery within a substantially encompassing visual environment.

16 Claims, 3 Drawing Sheets

METHOD AND APPARATUS FOR A DEPTH SEAMED THREE-DIMENSIONAL VISUAL ENVIRONMENT

FIELD OF THE INVENTION

This invention relates generally to three-dimensional imagery by computer generation, photographic processes and video processes for enhancing the realism of presented images. More specifically the present invention concerns a method and apparatus for achieving depth seamed processing and single or multi-screen display of such three-dimensional imagery such that the viewer is provided with the visual experience of being present within a three-dimensional visual environment containing the objects and the objects have the appearance of being located forward and rearward of screens having a screen plane that is visually imperceptible.

BACKGROUND OF THE INVENTION

Three-dimensional visual technology has been under development for many years. More recently, especially in the field of computer graphics, considerable developments in progress toward the provision of cost effective, marketable, and yet quality three-dimensional computer programs. While many manufacturers are marketing computer graphics programs that are referred to as three-dimensional, for the most part these programs are in the nature of orthographic representations of two-dimensional graphics, but do not present true three-dimensional representations of the subject matter being presented. As such they are not considered true three-dimensional graphical programs and the graphics that are presented lack the realism that could be otherwise obtained. A computer and peripheral system program, identified as Virtual Reality, has been recently developed which, for the most part, achieves three-dimensional viewing through utilization of a helmet or hood having internal individual crt screens for the user's eyes. The result is a fairly crude three-dimensional representation which lacks realism. The present invention referred to herein as Immersion Reality replaces the visual acuity drawbacks of Virtual Reality (VR) and Holograms.

Immersion Reality replaces the visual acuity drawbacks of Virtual Reality (VR) and Holograms. The visual quality of a standard Virtual Reality image is burdened with the fact that the technology is NOT capable of producing a high resolution image (within marketable financial restraints) above the level of flat-shading (this translates to when you see a VR rounded shape, it is represented as crude faceted object that is totally unconvincing as a round surface). Another detraction is that the cumbersome head tracking device that drives the imaging has an extremely nauseating time-lag between head movement and image movement thus making the VR technology unsatisfactory for most viewers to endure without getting physically sick. In comparison to holographic projection, our process of visualizing imagery is once again superior in cost and image quality. The main problem with holography is the extremely expensive equipment required to push the image and the requirement of highly trained technicians to program and operate the projection machine. The base starting price for computer, rotating laser assembly, and display glass cylinder usually requires the financial ability of a large University. Then the programming requirements are added with the technicians (usually with a masters degree or above) required for constant laser alignment and maintenance are extensive. Since all holographic images are transparent, it is usually hard to discern a near surface from a far surface on a moderately simple image. This gives conflicting visual cues and is the major detraction of holography.

SUMMARY OF THE INVENTION

It is the principle feature of this invention to produce a viewing environment incorporating a surrounding screen array of multiple wall screens capable of displaying seamed three dimensional visual imagery with the option of one or more screens for the ceiling and optionally one or more screens for the floor producing a totally encompassing visual environment. This will produce a visual environment with three dimensional visual data that will be projected out into the viewing room and immerse, envelope, and surround the viewer with realistic images that seem to not be visually attached to the viewing medium or screens.

It is another important feature of this invention to provide a novel process for seaming together multiple three dimensional perspective views to be viewed as one multi-dimensional visual experience.

It is also another important feature of this invention to provide a novel three-dimensional-seaming-algorithm to be utilized in procurement of imaging and the resultant projection of imaging. This algorithm's name is not inferred to mean that it is just utilized in three dimensional imagery, but the seaming process itself is actually built in three dimensional geometry.

It is also another important feature of this invention to establish the three-dimensional-seaming-algorithm's ability to employ an automated execution of acquiring and displaying three dimensional imagery across multiple screens in a natural flowing movement.

It is also a feature of this invention to provide a novel forward projection zone (FPZ) to be utilized as a tool for processing visual images for imagery that will appear to float out in mid air in front of the viewing medium or screen.

It is also a feature of this invention to provide a novel source for composing computer generated three dimensional visual images produced by a specific computer program that produces singular three dimensional and multiple seamed forward projected three dimensional surrounding images.

It is also a feature of this invention to provide a novel source of computer aligned physical array of video cameras, correlated to the three-dimensional-seaming-algorithm, to produce a three dimensional surrounding of multiple forward projected three dimensional imagery.

It is also a function of this invention to utilize an ocular separation device (OSD) generally associated with the separation principles of left-eye and right-eye imaging. Examples would be using passive polarized projector filters coupled with passive polarized eye wear, or utilizing sequencing active liquid crystal display (LCD) projector filters coupled with active sequencing LCD eye wear. No matter which OSD is utilized, and not limited to the examples mentioned here within, the process of having a left-eye image presented only to the left eye and a right-eye image presented only to the right eye, and both fused as one three dimensional image, is an integral component of this invention. The OSD has the inherent ability to view more than one screen or panel at a time.

It is also a feature of this invention to include a synchronized audio system for reproducing realistic supporting audio that will be keyed to the visual process in such a manner as to add realism and impact to the visual process.

It is another feature of this invention to incorporate the capability of utilizing "contributing props" to add realism and impact to the overall experience such as wind machines, temperature controllers, water sprayers, odor generators etc., but not limited to the examples mentioned here within.

It is also a feature of this invention to provide for the capability of "scrolling imagery" that will be utilized for travelling through visual environments that are projected into the substantially encompassing visual environment.

Briefly, the present invention is a process of viewing and generating images, either computer generated, recorded video, or live real time video, in an actual three dimensional visual environment in which the viewer and his or her body is totally surrounded by three dimensional images emanating from the wall screen array, and optionally from the ceiling screen array, and optionally also from the floor screen array, with all screens simultaneously displaying three dimensional imagery utilizing the three-dimensional-seaming-algorithm to allow the natural flow of imagery from one screen to another, and thus providing a 360 degree horizontal viewing arrangement, optionally coupled with a 360 degree vertical floor and ceiling viewing arrangement. These images are not flat-panel-viewing such as television or cinema theaters, but actual three dimensional images with discernable height, width, and most of all depth, that appear to float out in mid air in front of the view screens. The three dimensional images incorporating motion are seamed and synchronized so that an image or representation of an object for example, leaving one screen will appear seamlessly on a sequential screen in a natural flowing movement. Based on the fact that the images are perceived in front of, or behind each screen panel, the viewer feels his presence and body are "immersed" inside a visually generated environment without the normal visual cues associated with flat-screen-viewing. The screen plane is not distinguished or perceived by the viewer because of the depth of the imaging process totally surrounding the viewer causes the visual perception of "viewer immersion into the visual data".

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments which become obvious upon an understanding of this invention.

In The Drawings:

FIG. 1 is a graphical schematic illustration showing at the left side a dual camera spatial template and at the right side showing a forward projection zone.

FIG. 2 is a graphical schematic illustration showing a dual camera spatial template incorporating a forward projection zone incorporated therein.

FIG. 3 is a graphical schematic illustration in plan view showing an assembly of multiple dual camera spatial templates and multiple forward projection zones incorporating the three-dimensional seaming algorithm of this invention.

FIG. 4 is a graphical isometric schematic illustration showing the assembly of FIG. 3 and at the left side of the Fig. showing separation from the assembly of a screen component, a dual camera spatial template component and a forward projection zone.

FIG. 5 is a block diagram schematic illustration of operational components of a system embodying the principles of this invention.

DETAILED DESCRIPTION OF THE PREFERRED EMBODIMENT

Figure 1:
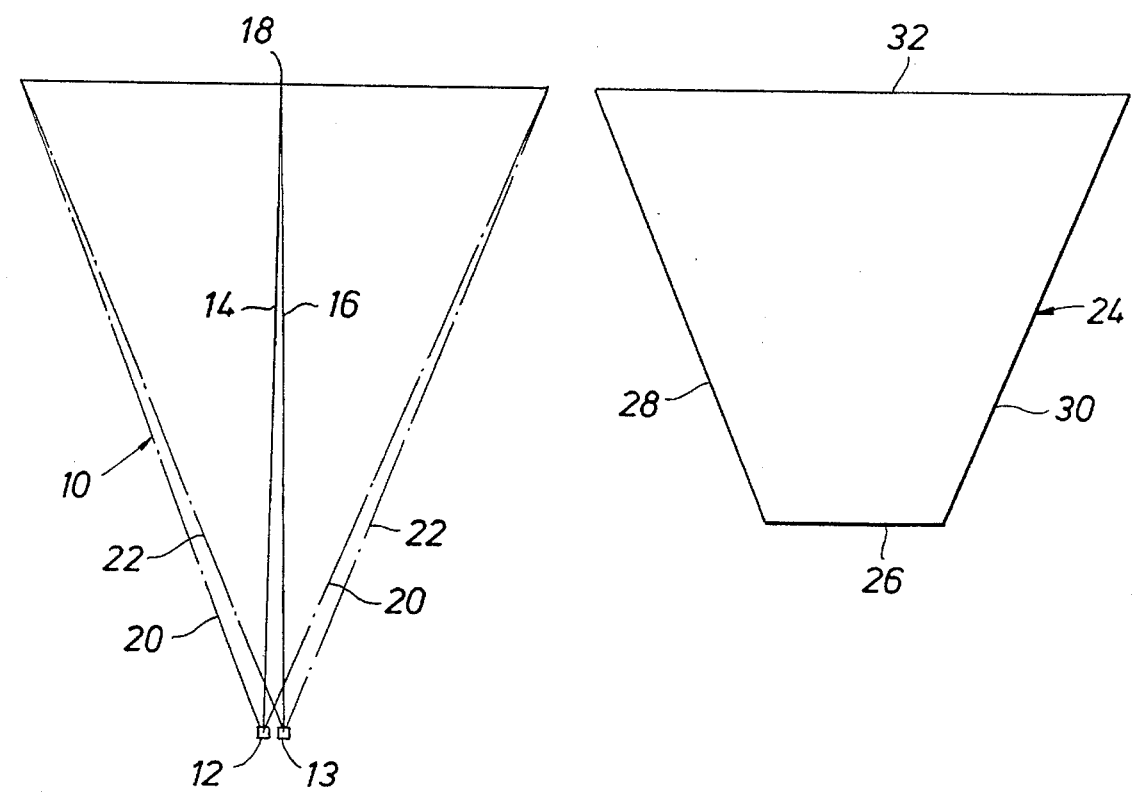

Referring now to the drawings and first to FIG. 1, the figure represents a dual camera spatial template shown generally at 10 which comprises a "tool" or process for controlling graphical presentation of three-dimensional subject matter. The dual camera spatial template incorporates perspective origination points 12 and 13 defining line of sight vectors 14 and 16 extending to a common convergence focal point 18. The dual camera spatial template 10 further incorporates field of view lines 20 and 22 projecting from respective perspective origination points 12 and 13. At the right side of FIG. 1 is a forward projection zone illustrated generally at 24 and being defined by a forward virtual wall 26, lateral limits 28 and 30 and a rear virtual wall 32 representing a screen plane. The dual camera spatial template for computerized graphical presentation is imported in software form. In real time video presentation the dual camera spatial template is utilized to establish physical direction and placement of hardware such as the cameras and screens.

Figure 2:
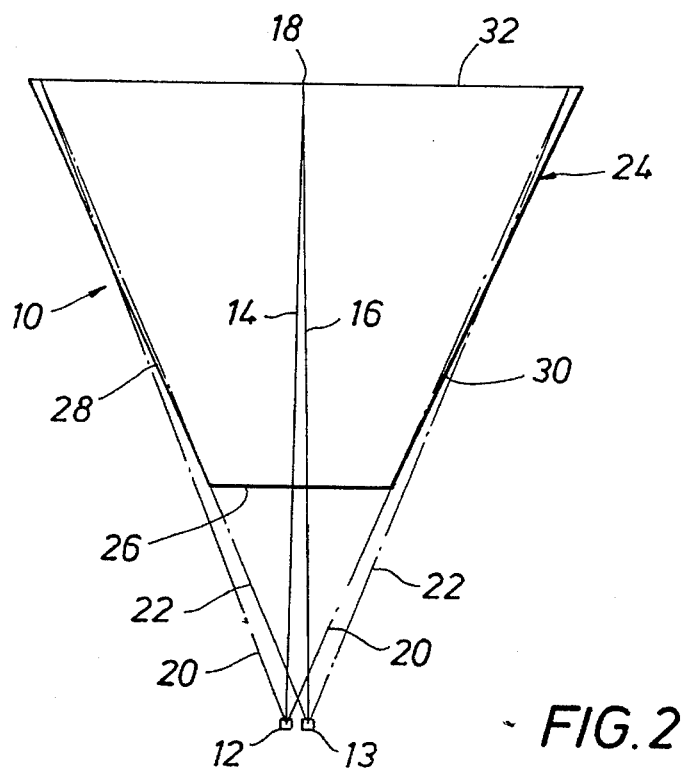

FIG. 2 represents a dual camera spatial template with which a forward projection zone is incorporated. Common reference numerals are utilized in FIG. 2 commensurate with FIG. 1.

Figure 3:
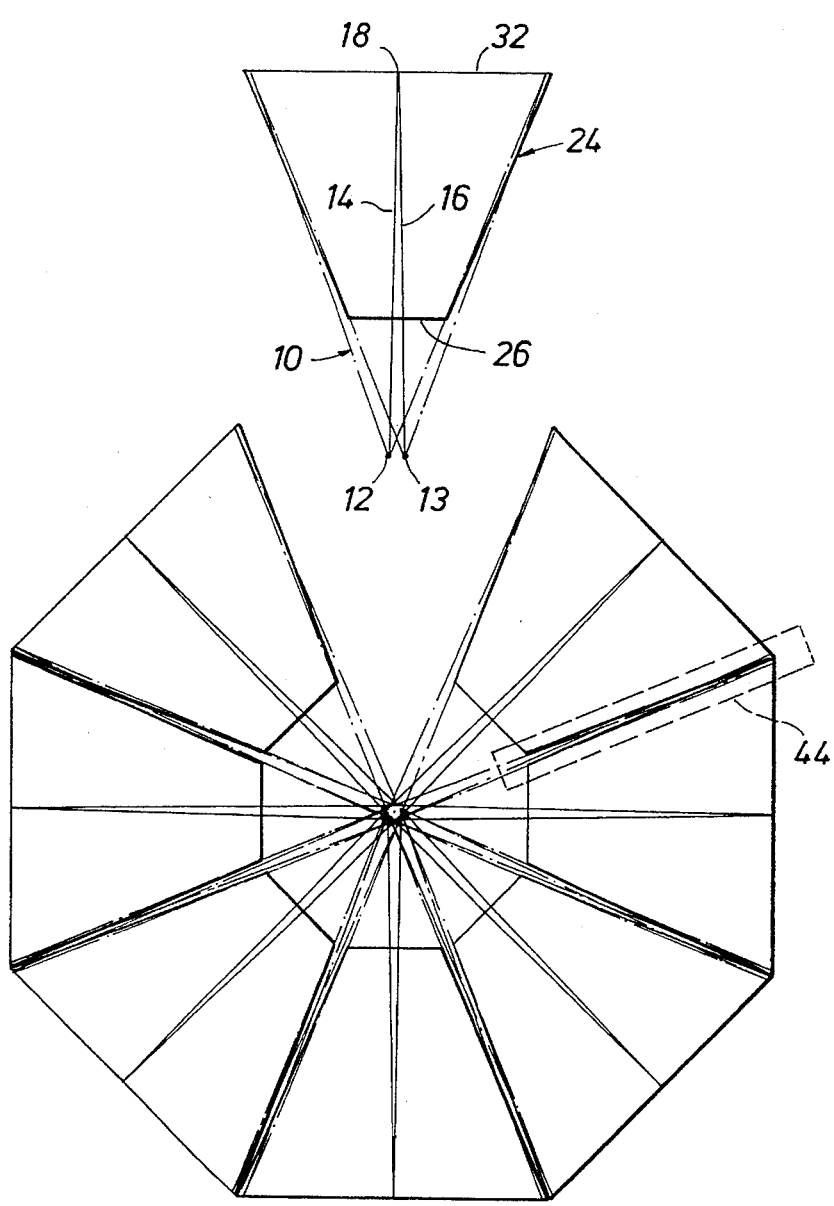

FIG. 3 is a top schematic illustration showing multiple dual camera spatial templates and multiple forward projection of zones incorporating a three-dimensional-seaming-algorithm. The figure illustrates separation of one of the dual camera spatial templates, one of the view screens, and one forward projection zone to illustrate its relationship in the multiple dual camera spatial template assembly. As shown in FIG. 3 eight dual camera spatial templates and eight multiple forward projection zones cooperate to define a substantially encompassing visual environment having the sixteen perspective origination points of the multiple dual camera spatial templates at the center thereof. As shown encompassed within broken lines within FIG. 3 a three dimensional seaming algorithm shown generally at 44 which executes depth seaming of adjacent forward projection zones.

Figure 4:
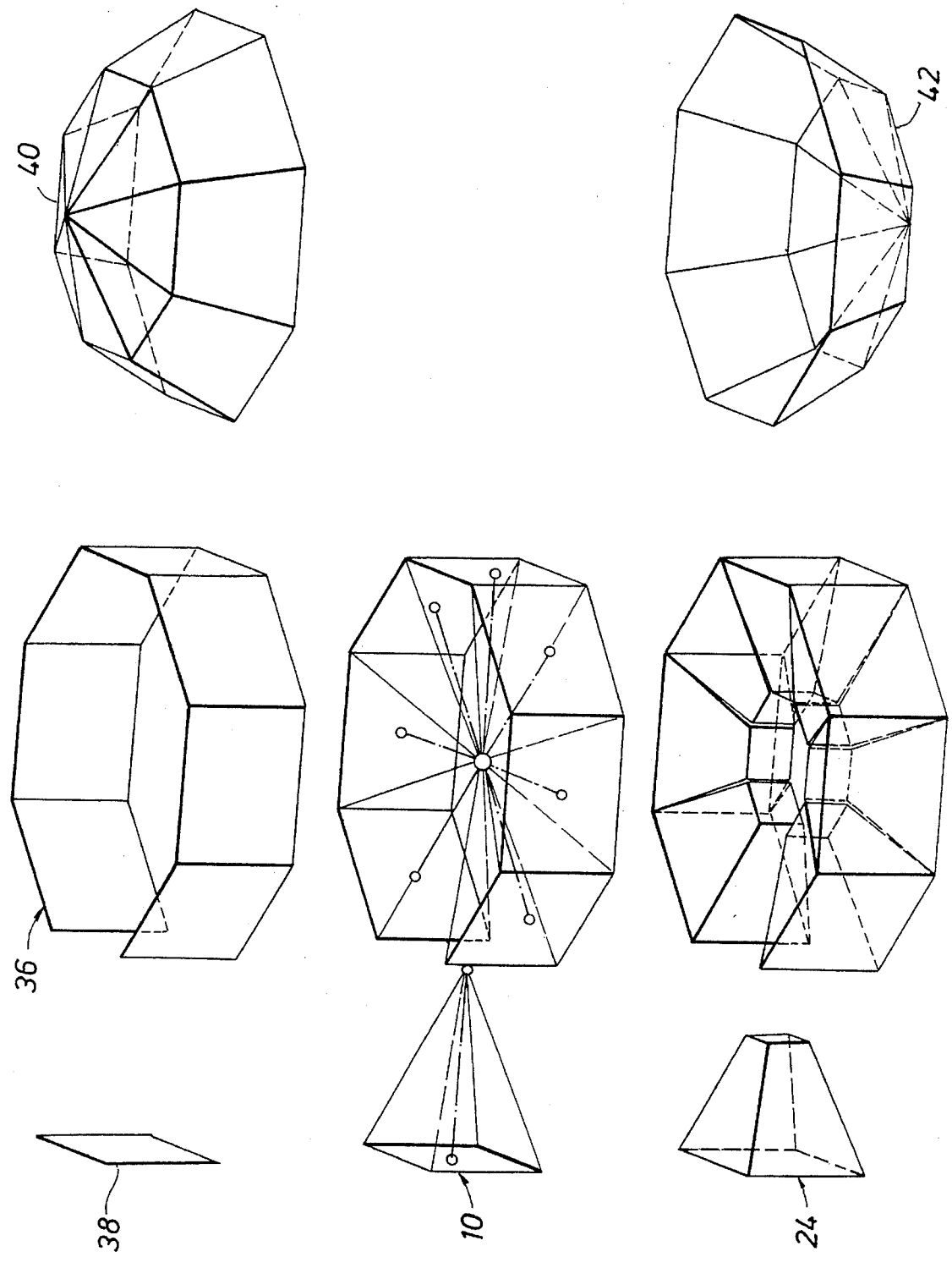

With reference to FIG. 4, the invention depicts a horizontal screen array shown generally at 36 consisting of eight substantially identical screens 38, eight dual camera spatial templates each of the configuration shown generally at 10 in FIGS. 1 and 2. The horizontal screen array 36 further incorporates eight forward projection zones shown generally at 24 in FIG. 1. The substantially encompassing visual environment may also optionally include a ceiling screen array 40 and/or floor screen array 42, which together with the horizontal screen array 36, provides the viewer with the visual experience of location within a sphere, but not limited to this geometrical shape. The components are shown in an exploded dissassemblage for explanatory purposes. The screen array is arranged in a pattern of eight to accommodate a dispersion angle of approximately forty five degrees horizontally associated with the field of view lines 20 and 22 of FIG. 1 emanating from the perspective origination points 12 and 13 of FIG. 1 and directed along the line of sight vectors 14 and 16 in FIG. 1 to the termination point called the common convergence focal point 18 in FIG. 1. The screens 38 of FIG. 4 are shown as paneled sections with edges touching but can be one continuous screen stretched in a circular pattern, or multiple screens of a television type or of a cathode ray tube (CRT) type screen array, but not limited to these examples mentioned here within. As shown at 40 and 42 in FIG. 4 vertically oriented screen arrays may be optionally employed in conjunction with the horizontal screen array 36 to provide a partly or completely spherical visual environment permitting the viewer to perceive the "sky" or the "ground" as if the viewer were physically present at the center of a visual sphere. The seaming algorithm functions in the vertical as well as the horizontal to provide for realistic transition of three-dimensional images to both horizontally and vertically arranged screens. Although the geometry of the figure is not controllably important, it should be born in mind that multiple screens of any configuration or a single screen of desirable configuration may be employed. The seaming algorithm will accommodate transition of images in height, width and depth regardless of screen configurations.

Dual Camera Spatial Template (DCST)

The dual camera spatial template 10 in FIG. 1 is a tool engineered specifically for this invention for the purpose of acquiring and synthesizing the visual subject matter into a multi-dimensional, multi-planar image used by this invention. The dual camera spatial template is arranged in a circular pattern to illustrate the use of the three-dimensional-seaming-algorithm 44 in FIG. 3 utilized in synthesizing the visual subject matter into a multi-dimensional multi-screen substantially encompassing visual environment. The dual camera spatial template is a component of the overall design consisting of two perspective origination points 12 and 13 of FIG. 1, a common convergence focal point 18 of FIG. 1, a forward projection zone 24 of FIG. 1, and utilizes an optimum convergence perspective algorithm for alignment.

The perspective origination point is a starting point for the position that represents where the human eye would be when correlated to the dual camera spatial template and incorporates lensing required to produce an approximate field of view 20 and 22 from the perspective origination point tapering outwardly both horizontally and vertically approximately forty five degrees toward the common convergence focal point. The dual camera spatial template contains two perspective origination points and are spaced apart from each other according to the requirements dictated by an optimum convergence perspective algorithm.

The common convergence focal point (CCFP) is a point where the human eye would focus when correlated to the dual camera spatial template and that distance is defined by the optimum convergence perspective algorithm. The dual camera spatial template contains only one common convergence focal point and is the stationary "aiming point" at the end of the line of sight vectors from the two perspective origination points.

Forward Projection Zone (FPZ)

The forward projection zone 24 in FIG. 1 is defined on its sides and top and bottom by the overlapping field of view lines 20 and 22 of FIG. 1 tapering outward from the two perspective origination points 12 and 13 in FIG. 1 toward the common convergence focal point 18 in FIG. 1 at an approximate angle of forty five degrees, and the rear virtual wall 32 of FIG. 1 is defined by a vertical plane representing the screen plane at the common convergence focal point, and the forward virtual wall 26 in FIG. 1 is defined by a measured distance of more than two thirds, but less than three fourths of the distance from the common convergence focal point to the perspective origination points representing maximum forward projection of imagery. The forward virtual wall of the forward projection zone is varied slightly within these two distances according to the size of the visual subject matter in relation to the overall size of the forward projection zone itself, translating to larger visual subject matter objects utilize a distance closer to the three quarters distance, and smaller visual subject matter objects utilize a distance closer to the two thirds distance. The forward projection zone is an area that, when occupied by the subject matter for viewing, automatically projects the visual subject matter out from the viewing screen, when viewed by this invention, with the correct mathematical ocular perspective normalized by the human eye, proportionately to the distance where the visual subject matter is placed or moved within the forward projection zone.

The optimum convergence perspective algorithm sets forth the designation of two perspective origination points to be placed at a stationary distance of one decimal two (1.2) inches apart from each other and the common convergence focal point set at a stationary distance perpendicular to their common vector, of twenty inches from the perspective origination point set.

OPERATION

Figure 5:
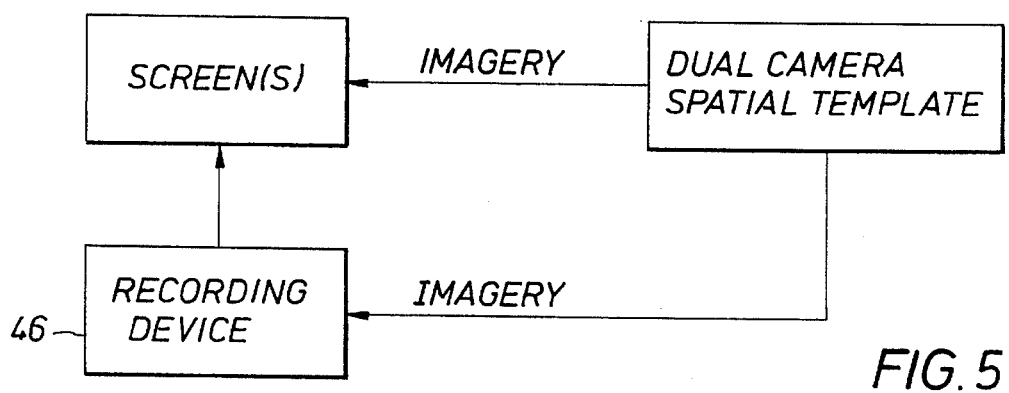

The primary platform for utilization of the dual camera spatial template 10 is from a computer program designed specifically for this invention, but can be substituted by photographic equipment or standard actual video cameras meeting the lensing and field of view requirements utilized by the dual camera spatial template. Whichever source is utilized, the images generated by the dual camera spatial template are displayed on screen and utilizing the three-dimensional-seaming-algorithm shown graphically by broken line at 44 in FIG. 3 on the screen array illustrated by the multiple dual camera spatial templates arranged in a circular pattern. The dual camera spatial template is operated by keeping the template stationary and moving the visual subject matter within the template. The dual camera spatial template has been engineered to perform three dimensional imagery sequencing in relation to where the visual subject matter is moved within the template. The forward projection zone is the tool utilized in making decisions as to where the visual subject matter will appear in front of the screen when viewed after it is processed through the dual camera spatial template. When the visual subject matter is placed at the front end of the forward projection zone where the common convergence focal point 18 is located, the visual subject matter will appear to be at the screen plane when viewed on the view screen, when the visual subject matter is placed at the rear virtual wall 26 of the forward projection zone the visual subject matter will appear about four fifths of the distance from the viewing screen to the viewer himself when the image is displayed. The lateral, vertical, and rear confines, as is apparent from the forward projection zone assembly shown at the bottom of FIG. 4, are placed upon the forward projection zone to indicate virtual walls that visual subject matter should not be moved through. When visual subject matter is moved through the forward virtual wall outside the confines of the forward projection zone the resultant viewed imagery will appear as if it is visually located on the other side of the viewing screen from the viewer. The forward virtual wall 32 of the forward projection zone represents the position of the screen plane when the resultant image is viewed, and is also a threshold through which images may be viewed in front of, behind, and pass through without restriction. These images from the dual camera spatial template can be displayed on screen actively in a real-time mode as the visual subject matter is moved within the dual camera spatial template, and can be stored in a storage device shown at 46 in FIG. 5 that is capable of playing back multiple images for recorded viewing.

Multiple dual camera spatial templates are employed utilizing a three-dimensional-seaming-algorithm 44 which states the depth zones of adjacent forward projection zones must match dimensionally for correct three dimensional seaming of the visual subject matter to occur. When placement of dual camera spatial templates are arranged adjacently, the lateral side constraints 28 and 30 of the forward projection zones placed on the visual subject matter are removed allowing the visual subject matter to flow seamlessly through out said screen array.

Ocular Separation Device (OSD)

Employment and utilization of an ocular separation device with this invention provides ocular separation of the images allowing the disparate imagery to be seen by the correct ocular representative of the perspective origination points. Examples would be polarized filtering and eye wear including polarized contact lenses, and liquid crystal display (LCD) filtering systems, but not limited to aforementioned examples, having the capability to view a three dimensional imagery with the inherent ability to view multiple said imagery simultaneously.

Audio Support and Enhancement System

The technology presently exists for providing audio support and enhancement of the visual experience by utilizing sequencing and schronizing audio in conjunction with the visual imagery.

Experience Reinforcement Props

To enhance the impact of the three dimensional imagery upon the viewer various reinforcement props may be correlated with the visual imagery. Such props may include air blowers for wind simulation, water sprayers, temperature controllers, odor generators, etc.

EXAMPLES OF AN APPLICATION

Business:

Through use of the present invention parties engaging in international business meetings can discuss their relations with each other with the visual perception of each attending the same meeting though they may be physically located continents apart. Utilizing the present invention "3-D Holoprojection" with one set of representatives in one company, in the U.S. for example, can visually talk face to face with their counterparts in another company, in Japan for example. This will let diplomacy take place from the comfort and security of their own companies and will significantly minimize the need for international travel.

Entertainment:

In the Malls around America, 3-D Holoprojection can be translated from the popular karate or kick boxing game into the 3-D Holoprojection format for enhanced realism and total surrounding of the video game.

Sports:

The present invention permits viewers to have the capability of visually being on the playing field with the super stars of football, soccer, or baseball, etc. Also contact sports such as boxing become vividly real. Being able to see all aspects of major sporting events such as the olympics in Immersion Reality gives the viewer the added sense of actually "being there."

Exploration:

The present invention will permit an exploratory user to send an "3-D Holoprojection" camera apparatus on a probe to an interplanetary body such as Mars and provide cameras on a "Mars Rover" similar to the previous lunar rover which are positioned according to the optimum convergence algorithm identified above. The scientists will then be able to guide the rover over the planets surface and view the Martian landscape as if they were physically present on planet Mars. The ability to view objects in real time three-dimension video could significantly enhance the results of the exploratory process.

What is claimed is:

1. A computer controlled method for achieving three-dimensional imagery having the appearance of being located between the viewer and a screen, comprising:

(a) providing an array of screens on which images are displayed for visual observation, said array of screens defining a multiple screen array;

(b) establishing a dual camera three-dimensional spatial template for computerized graphical presentation having a pair of perspective origination points and field of view limits from said perspective origination points and having a rear virtual wall located at a common convergence focal point for both perspective origination points and a forward virtual wall located between said perspective origination points and said common convergence focal point;

(c) generating by computer processing a plurality of three-dimensional images of objects within said spatial template;

(d) optically aligning said three-dimensional images in depth by computer processing of adjacent images with a three-dimensional optical alignment algorithm;

(e) displaying said optically aligned three-dimensional images on said array of screens; and (f) achieving ocular separation of said three-dimensional images upon viewing of the same, permitting ocularly organized visual observation of respective images on said plurality of screens by each eye of a person viewing said images and thus providing the visual experience of physical presence of a three-dimensional object located between the viewer and said plurality of screens.

2. The method of claim 1, wherein said array of screens are adjacent one another and are arranged to establish a substantially encompassing visual environment, said method including:

(a) said generating said three-dimensional images comprises generating adjacent three dimensional images; and (b) seaming said adjacent three-dimensional images by processing of said adjacent images by said three-dimensional seaming algorithm, thus providing the viewer with the visual experience of being immersed in the viewing environment.

3. The method of claim 1, wherein said plurality of screens comprise computer screens, said method including:
   (a) establishing said three dimensional spatial template by means of "x", "y" and "z" computer coordinates defining ocularly arranged spatial templates; and
   (b) displaying on said array of screens ocularly arranged computer generated images established by said ocularly arranged three dimensional spatial templates.

4. The method of claim 1, wherein said array of screens comprise video screens, said method including:
   (a) establishing an aligned physical array of video cameras each oriented for viewing a subject and providing a video output image in reference thereto;
   (b) processing said video output images for elimination of visual subject matter occurring exteriorly of said ocularly arranged spatial templates, thus establishing three dimensional video output images, except wherein said exterior visual subject matter falls outside said rear virtual wall of the forward projection zone thus producing rear projected visual imagery;
   (c) aligning said three dimensional video output images of said aligned physical array of video cameras by computer processing of said three dimensional video output images by a three dimensional alignment algorithm; and
   (d) displaying on said video screens said aligned three dimensional video images.

5. A method for achieving realistic appearing three dimensional imagery, comprising:
   (a) providing screen means on which images are displayed for visual observation, said screen means establishing a viewing environment;
   (b) establishing a dual camera three dimensional spatial template having a predetermined convergence perspective said dual camera three dimensional spatial template being defined by a pair of spaced perspective origination points and field of view limits therefrom to a rear virtual wall being defined at a common convergence focal point for said spaced perspective origination points;
   (c) generating three dimensional images of objects within said dual camera three dimensional spatial template;
   (d) optically aligning said three dimensional images by computer processing thereof with a three dimensional alignment algorithm;
   (e) displaying said three dimensional images on said screen means; and
   (f) achieving ocular separation of said images upon viewing of the same by right-eye, left-eye imaging, permitting ocularly organized visual observation of respective three dimensional images by each eye of a person viewing said images.

6. The method of claim 5, wherein said screen means comprises a plurality of screens being adjacent one another and establishing a substantially encompassing visual environment, said method including:
   (a) said generating said three dimensional images comprises generating adjacent three dimensional images; and
   (b) aligning said adjacent three dimensional images by computer processing thereof with a three dimensional alignment algorithm, thus providing the viewer with the visual experience of being immersed in the viewing environment.

7. The method of claim 5, wherein said screen means is at least one computer screen, said method including:
   (a) establishing said three dimensional spatial template by means of "x", "y" and "z" computer coordinates defining ocularly arranged spatial templates; and
   (b) displaying on said at least one computer screen ocularly arranged computer generated images established by said ocularly arranged three dimensional spatial templates.

8. The method of claim 5, wherein said screen means comprises at least one video screen, said method including:
   (a) establishing an aligned physical array of video cameras each oriented by an optimum convergence algorithm for viewing a subject and providing a video output image in reference thereto;
   (b) establishing a forward projection zone in relation to said ocularly arranged spatial template;
   (c) processing said video output images for elimination of visual subject matter occurring exteriorly of said ocularly arranged spatial template, thus establishing three dimensional video output images, except wherein said exterior visual subject matter falls outside the forward wall of the forward projection zone thus producing rear projected visual dimensional imagery;
   (d) seaming said three dimensional video output images of said aligned physical array of video cameras; and
   (e) displaying on said at least one video screen said seamed three dimensional video images.

9. A three-dimensional computer controlled imaging system enabling a viewer to have the visual perception of being immersed in an environment of three-dimensional imagery being displayed by a computer defined screen array, comprising:
   (a) at least one computer defined screen on which computer processed images are displayed;
   (b) a computer generated dual camera spatial template for acquiring and synthesizing visual subject matter into a multi-dimensional, multi-planar image said dual camera spatial template having a pair of perspective origination points and field of view limits from said perspective origination points and having a rear virtual wall located at a common convergence focal point for both perspective origination points;
   (c) said dual cameral spatial template defining a forward projection zone for processing visual images to provide a visual appearance location between said computer defined screen and the viewer and thus providing the visual experience of the physical presence of three-dimensional objects located between the viewer and said screen array; and
   (d) means for ocular separation to achieve left-eye and right-eye imaging.

10. The substantially encompassing visual environment of claim 9, wherein said means defining a dual camera spatial template comprises:
   (a) two perspective origination points representing the location of the human eye in correlation with the dual camera spatial template;
   (b) a common convergence focal point representing the direction of sight aiming point of the perspective origination points;
   (c) a forward projection zone located between the perspective origination points and the common convergence focal point; and (d) an optimum convergence perspective algorithm defining placement and relationships of said perspective origination points, common convergence focal point, and said forward projection zone.

11. The substantially encompassing visual environment of claim 9 wherein said screen means comprises:

a single screen device utilizing said dual camera spatial template and components thereof.

12. The three-dimensional computer controlled imaging system of claim 9 wherein said computer defined screen array comprises:

(a) a screen array incorporating a plurality of computer defined screens;

(b) a plurality of said dual camera spatial templates, for said computer defined screens; and (c) a three-dimensional image alignment algorithm for computerized placement of said dual camera spatial templates for aligning visual subject matter for transition by said computer defined screen array.

13. The computer controlled three-dimensional imaging system of claim 12 wherein said three-dimensional image alignment algorithm incorporates automated linear depth measurements following computer defined placement of plural forward projection zones to accomplish depth alignment of visual subject matter when a plurality of said dual camera spatial templates are employed.

14. The computer controlled three-dimensional imaging system of claim 9 wherein said computer defined screen array comprises:

(a) a plurality of horizontally arranged computer defined screens arranged to substantially encompass the viewer; and (b) a plurality of computer defined elevation screens arranged to substantially define a portion of a sphere and to receive three-dimensional images representing vertical positioning relative to said horizontally arranged computer defined screens.

15. The computer controlled three-dimensional imaging system of claim 14 wherein said elevation screens include:

(a) screens arranged above said horizontally arranged screens; and (b) screens arranged below said horizontally arranged screens.

16. The computer controlled three-dimensional imaging system of claim 15 wherein:

said three-dimensional alignment algorithm accomplishes alignment in depth of images appearing on both said horizontally and vertically arranged computer defined screens.

* * * * *